Jan. 25, 1966     J. S. FINGER     3,231,654
PROCESS OF FORMING A REINFORCED RESIN PANEL
Original Filed Oct. 29, 1962     5 Sheets-Sheet 1

INVENTOR
Joseph S. Finger
BY
ATTORNEY

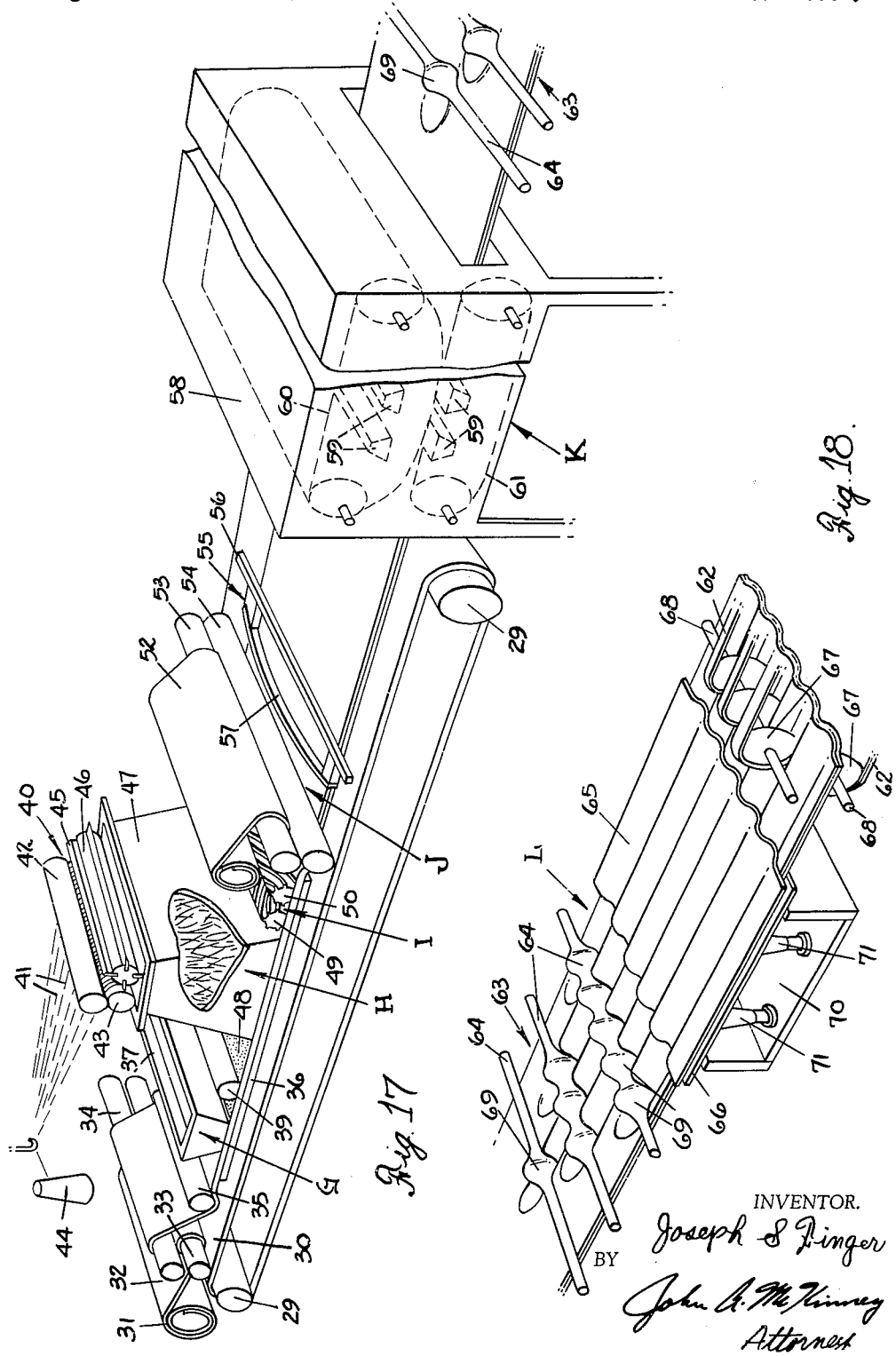

Jan. 25, 1966                  J. S. FINGER                 3,231,654

PROCESS OF FORMING A REINFORCED RESIN PANEL

Original Filed Oct. 29, 1962                      5 Sheets—Sheet 5

INVENTOR.
BY Joseph S. Finger
John A. McKinney
Attorney

United States Patent Office
3,231,654
Patented Jan. 25, 1966

3,231,654
PROCESS OF FORMING A REINFORCED
RESIN PANEL
Joseph S. Finger, Houston, Tex., assignor to Johns-Manville Corporation, New York, N.Y., a corporation of New York
Original application Oct. 29, 1962, Ser. No. 235,599. Divided and this application Aug. 10, 1965, Ser. No. 478,695
10 Claims. (Cl. 264—261)

This application is a division of U.S. Patent application Serial No. 235,599, filed October 29, 1962. This invention relates generally to synthetic resin products, and more particularly to a novel reinforced resin panel and an improved method of producing such a panel.

Translucent, reinforced thermosetting resin panels are widely used in the building and construction industry as walls, partitions, patio roofs, skylights, awnings, windows, etc. A principal advantage in the use of such resin panels is the transmission of subdued light thereby and high strength when the panels are reinforced. The type of reinforcing commonly used comprises glass fibers which are preferably coated with a binding agent to create a better bond with the thermosetting resin. However, in making such panels it is quite common for a certain amount of the reinforcing fibers to be disposed at or near the surfaces of the panels and only nominally covered with resin due to the normal manufacturing processes used in forming the panels. These surface fibers, as a result of erosion of the resin covering by the elements, become exposed and render the panel objectionable after a relatively short period of time. Upon being exposed, the fibers appear as white streaks and have an unpleasant visual appearance when colored resin is used. In addition, the exposed fibers hinder light transmission and also catch dirt, grease and other light barriers which would further retard the transmission of light.

Accordingly, an article with good erosion resistance has been long sought. It has now been determined that such an article may be provided by making a panel wherein a film containing a decorative pattern comprising a multiplicity of protuberances is applied to a layer of fibrous reinforced uncured thermosetting resin, and thereafter, a relatively small amount of pressure is applied to the film whereby the protuberances cause relative movement of the outermost fibers with respect to the resin to force said fibers toward the interior of the resin layer and conform the surface of the resin layer to the patterned sheet.

Objects

Therefore, an important object of the present invention is to provide a reinforced resin panel having improved erosion resistance qualities and a method of making such a panel.

Another object of the invention is to provide a fibrous reinforced resin panel wherein the reinforcing fibers are protected against the effects of erosion by a resin rich surface of attractive design.

Still another object of the invention is to provide a method of making such a resin panel wherein the outermost reinforcing fibers are maintained in a more interior portion of the panel during the formation thereof than heretofore practiced.

Other objects and advantages of the invention will become more apparent during the course of the following description when taken in connection with the accompanying drawings.

In the drawings, wherein like numerals are employed to designate like parts throughout the same:

FIG. 17 shows one type of apparatus adapted to carry out the method of the invention in a continuous manner;

FIG. 18 is a continuation of the apparatus of FIG. 17.

Description of the invention

Figure 1:
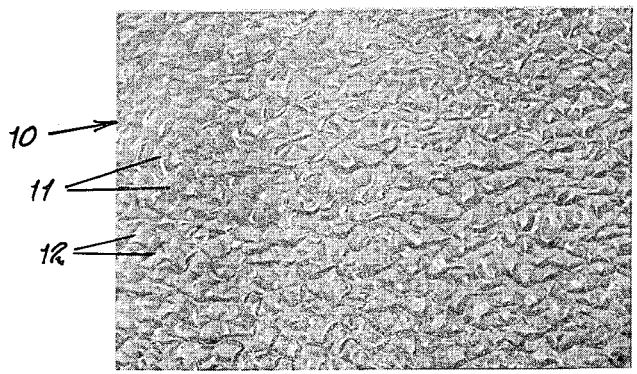
FIG. 1 is a photograph of the novel reinforced resin panel produced in accordance with the invention.
Figure 2:
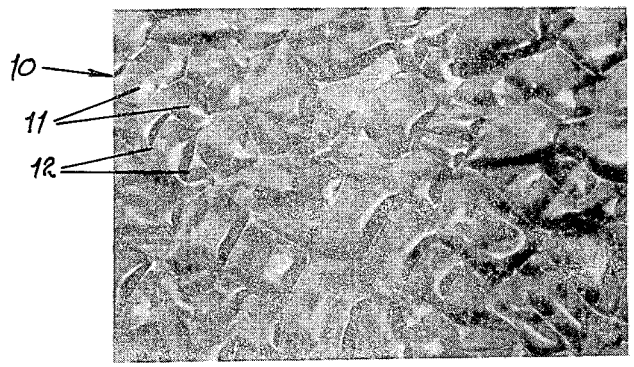
FIG. 2 is a photograph of the panel shown in FIG. 1 and enlarged 4 to 1.

With continuing reference to the drawings, the fibrous reinforced resin panel 10 produced in accordance with the invention, and as shown in FIGS. 1 and 2, is characterized by both the decorative and utilitarian features of the surface configuration thereof. The bas-relief pattern of irregular resin rich mounds of protuberances 11 gives an eye-pleasing appearance and provides a glossy finish. Also, the close spacing of the mounds with relatively narrow valleys 12 therebetween is highly resistant to erosion by the elements as compared to a surface configuration characterized by spaced ridges and relatively wide valleys therebetween wherein the outermost reinforcing fibers are close to the surface of the panel.

For purposes of erosion resistance, it is desirable that a minimum of about four to eight mounds be provided per square inch of panel surface and separated from one another by valleys not greater than about 1/16 inch. Preferably, about 20 to 40 mounds, roughly circular in shape, are provided per square inch of surface area. A desirable valley width or spacing of one mound from the other would be about 1/128 to 1/32 inch although valley widths up to 3/16 inch could be considered satisfactory. The mound heights, as measured from the bottoms of the valleys therebetween, should be between about 1/128 to 1/16 inch and preferably average from about 1/64 to 1/32 inch. Mound and valley spacings within the limits above set forth prevent relatively wide spaces between adjacent mounds which would allow wind and rain to readily attack the valleys wherein, as will be later set forth, the reinforcing fibers are close to the surface.

Figure 9:
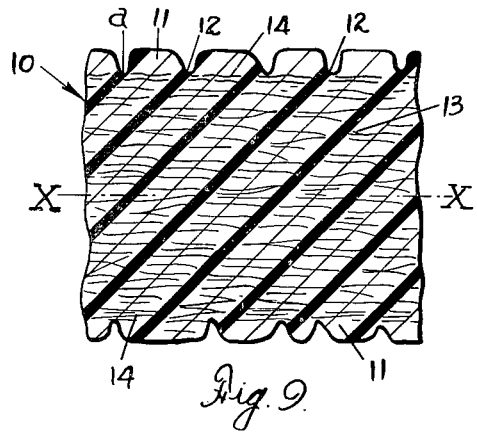
FIG. 9 is a fragmentary cross-sectional view of the panels of FIGS. 1 and 2 showing the location of the outermost reinforcing fibers.

As shown in FIG. 9, the mounds 11 of the panel 10 are formed on both surfaces thereof and comprise substantially 100% resin. The fibrous reinforcement 13 comprises glass fibers disposed immediately below the floor or base $a$ of the valleys 12. Thus the eroding or wearing away of the mound surfaces will not expose the outermost fibers which, in the case of colored resins, would appear white when exposed and give an unpleasant visual appearance to the panel.

For best resistance to flexural stresses, it is desirable that the preponderance of the reinforcing fibers 13 in the body of the panel 10 be substantially parallel to the neutral axis $x$—$x$ thereof as shown in FIG. 9. However, with respect to the surface fibers 14, it has been found advantageous in some instances if these fibers project into the mounds a limited distance above the base $a$ of the valleys 12.

As will be later set forth in detail, with proper control of the resin viscosity, fiber diameter, mound spacing, etc., it is possible to produce a fibrous reinforced panel 15 (FIG. 10), having the general characteristics of the panel 10 shown in FIG. 9, wherein the surface fibers 16 have a reverse curvature imparted thereto and are concavo-convexly curved beneath the valleys 12 and convexo-concavely curved beneath the mounds 11. The principal advantages of so curving the surface fibers is that it makes possible a greater height of mound since the maximum mound height is primarily dependent upon the distance from the mound surface to the outermost reinforcing fibers 16.

The high erosion resistance of the novel resin panel produced in accordance with this invention can be best understood by reference to FIGS. 3 to 8 wherein there are shown photographs of comparable fibrous reinforced resin panels and the improved panel of this invention after being subjected to tests calculated to approximate the action of the elements.

Figure 5:
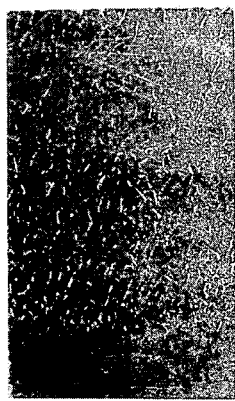
FIGS. 3, 4 and 5 are photographs of three different reinforced resin panels after having been subjected to one type of accelerated erosion test.
Figure 4:
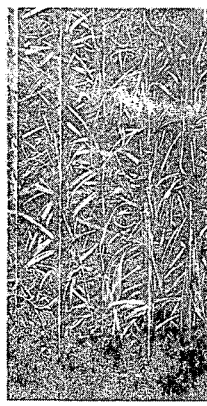
Figure 3:
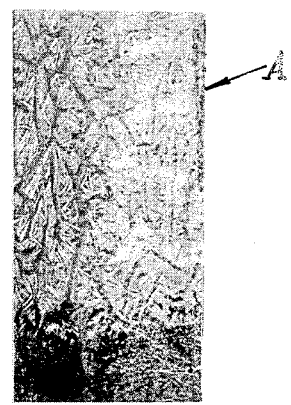

FIGS. 3 and 4 show fibrous reinforced resin panels A and B respectively of conventional manufacture while FIG. 5 shows the improved product C of this invention. The three samples shown were subjected to an accelerated erosion test involving the use of acid. The test procedure used was as follows: The three samples were strung on suspension rods with washers inserted there-between to make certain that the samples were spaced from one another. The assembly of samples was then lowered into a container of sulfuric acid (technical, 66° Baumé—96%—curtain number 38523F) at room temperature and left therein for ten minutes. At the end of ten minutes, the samples were removed from the acid, rinsed with tap water at room temperature, and then placed in an oven operated at 125° F. until dry.

As shown in the photographs, the panel A, which had a wrinkled surface, exhibited excessive erosion with full length surface fibers (white lines) exposed, while panel B, which had a smooth surface, also exhibited excessive erosion with approximately 100% of the surface fibers exposed. However, the improved product C of the invention exhibited only slight erosion in terms of fiber exposure and the portions of the few fibers that were exposed were no longer than 1/8 inch and show up as white dots in FIG. 5. The resistance of the improved product to the acid is due to the fact that only fibers located beneath the base $a$ of the valleys 12 (FIG. 9) between the mounds are close enough to the surface to be exposed by erosion whereas the fiber portions beneath the mounds are adequately protected thereby and yet provide proper reinforcement for the mounds. In this connection, it should be noted that even though panel A has an irregular surface configuration, the fibers thereof are still disposed close to the surface over all portions of the panel and thus will become exposed after only a small amount of erosion.

Figure 6:
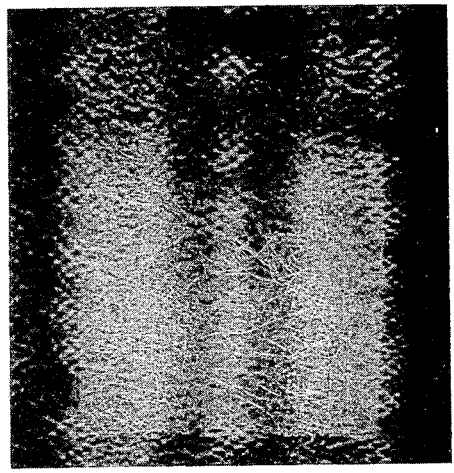
FIGS. 6, 7 and 8 are photographs of three different resin panels after having been subjected to another type of accelerated erosion test.
Figure 7:
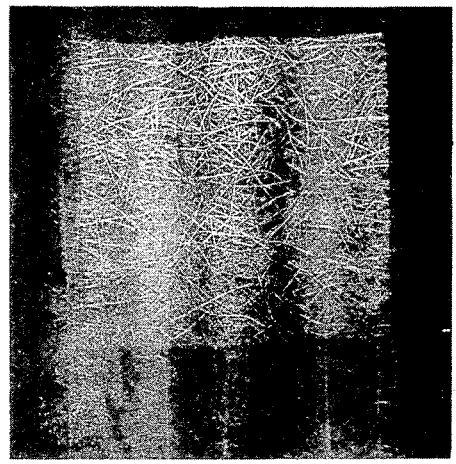
Figure 8:
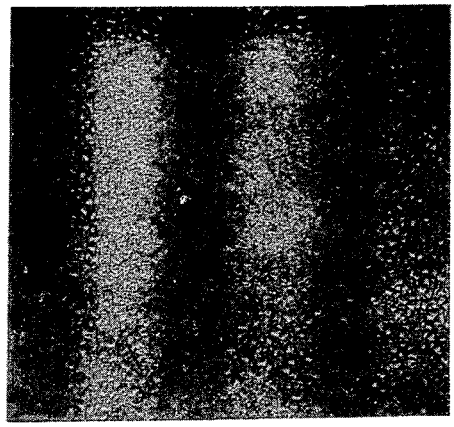

FIGS. 6 to 8 are photographs of three other samples of fibrous reinforced resin panels, with FIGS. 6 and 7 illustrating panels D and E respectively of conventional manufacture, and FIG. 8 illustrating the improved panel F of this invention. Each of these samples was subjected to an accelerated erosion test as follows: A nozzle having a 1/4 inch outlet was positioned about 24 3/8 inches from the surface of the sample and an area of the sample about the margin thereof was masked leaving the central portion exposed. One thousand grams of 20–30 mesh sand was then directed through the nozzle onto the sample under a pressure of 80 p.s.i.

After being subjected to the above test, panel D exhibited moderately heavy erosion which exposed some full length fibers while panel E exhibited heavy erosion with a large number of full length fibers exposed. The improved product F of this invention, however, exhibited very little erosion with only extremely small portions of fibers being exposed.

The thermosetting resins employed may include various thermosetting materials, such as the polyesters and polyesters-styrene blends, alkyd resins, and variations of the synthetic thermosetting materials which may be made by one skilled in the art to produce a resin originally in a liquid state which is capable of polymerization to a hard, strong and solid mass. However, best results have been obtained from the polyester-styrene or polyester-styrene methyl-methacrylate blends which are predominately polyester.

If rapid curing is desired, various catalysts may be used to aid in curing the resin, and for this purpose, organic peroxide catalysts such as methyl ethyl ketone peroxide, benzoyl peroxide, tertiary butyl perbenzoate and the like are quite satisfactory. Also, various promoters and accelerators known to the art may be used such as the mercaptans, cobalt napthenate or amines.

In accordance with this invention the novel resin panel herein disclosed may be produced economically by a process involving the use of one or more thin flexible plastic sheets or films having a multiplicity of spaced protuberances separated by valleys formed therein in intaglio and in pattern form. Briefly stated, the preferred method of the invention comprises sandwiching a flowable thermosetting resin having fibrous reinforcement therein between a pair of such films, at least one of which has the protuberances formed therein in a pattern form, applying relatively light pressure to the laminate thus formed to cause the protuberances in the film to penetrate the surface of the resin and force the fibers adjacent the surface toward the interior of the resin and the resin itself into the valleys of the film, and then curing the resin in contact with the films to reproduce the film pattern on the surface of the resin in bas-relief. Although various patterned films or sheets could be used, such as a very thin flexible metal foil, plastics such as cellulose, and cellulose derivatives, etc., excellent results have been obtained by using thin flexible films of cellulose acetate.

Figure 11:
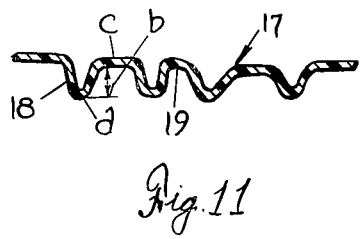
FIG. 11 is a fragmentary cross-sectional view of a relatively thin plastic sheet or film used in the method of the invention to form the decorative surface on the panel as well as to locate the outermost reinforcing fibers.

As shown in fragmentary cross-sectional view in FIG. 11, the cellulose acetate film 17 used in the method of the invention has the configuration or pattern formed therein in intaglio which is to be imparted to the surface of the finished resin panel in bas-relief. As previously mentioned, and as shown on the panel in FIGS. 1 and 2, this pattern comprises a series of mounds or protuberances somewhat irregular in shape and separated from one another by intersecting valleys. The protuberances 18 in the film 17 correspond to the valleys 12 in the resin panel, and the valleys 19 in the film correspond to the mounds 11 of the panel. Primarily, the distance b between the base c of the valleys 19 and the peaks d of the protuberances 18 is determined by the depth to which it is desired that the surface fibers be depressed and by the desired height of the resin mounds in the panel.

The thickness of the film 17 is preferably maintained at a minimum to afford economy of operation to the process as well as to facilitate shaping of the resin after the surface pattern is imparted thereto if such shaping is desired. Satisfactory results have been obtained for patterns of the type and dimensions previously set forth with film thicknesses in the order of about 0.001 inch, manufactured by the Celanese Corporation of America under its designation P–904.

In carrying out the invention, such a film, having a pattern formed therein corresponding to that shown on the panel in FIGS. 1 and 2, is laid upon a table and a layer of polyester-styrene blend having a catalyst incorporated therein is flowed onto the film in a uniform layer approximately $\frac{1}{16}$ inch in thickness. A glass fiber mat, or loose fibers of glass, is then submerged in the resin to form the assemblage 20 shown in FIG. 12, wherein the reinforcing fibers are designated by the numeral 21, the layer of resin by 22, and the lower film by the numeral 23. Since the protuberances 18 in the lower film extend upwardly into the layer of resin, the lowermost reinforcing fibers 24, when submerged in the resin, contact the peaks d of the protuberances 18 and their position in the resin is fixed thereby.

Figure 12:
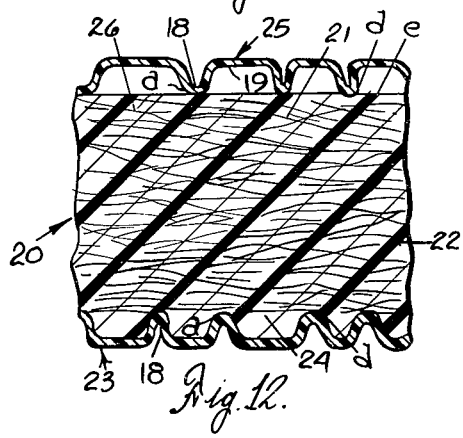
FIG. 12 is a fragmentary cross-sectional view showing the resin panel at one stage in the formation thereof.
Figure 13:
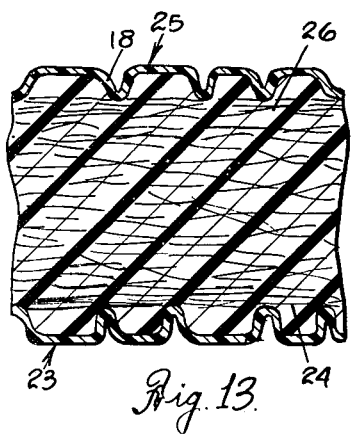
FIG. 13 is a fragmentary cross-sectional view showing the resin panel in another stage in the formation thereof.

A second cellulose acetate film 25, identical to the film 23, is then laid over the upper surface of the resin and forced downwardly into intimate contact therewith by means of a roller or other suitable means and using a pressure of about 2 to 3 pounds per square foot, dependent upon the viscosity of the resin. As shown in FIG. 12, the uppermost film 25 prior to being forced into full contact with the resin, will contact the resin surface e only at the peaks d of the protuberances 18 and certain of the reinforcing fibers designated at 26 will be disposed immediately adjacent the surface e or spaced just below the surface. As the uppermost film 25 is then forced downwardly into the resin, the peaks d of the protuberances 18 contact the fibers 26 and force them deeper into the body of resin while at the same time the uppermost strata of resin flow into the valleys 19 in the film until the film is in full contact with the resin as shown in FIG. 13 wherein it will be noted that the fibers 26 have been depressed or forced downwardly into the body of resin and are disposed adjacent the surface thereof only at the valleys 12 of the resin surface pattern which, of course, corresponds to the film protuberances 18.

After the application of pressure, the films adhere to the resin and the resin laminate thus formed is then cured to its hard state wherein the surface pattern is fixed by heating through a temperature range beginning at about 120° F. and gradually increased to about 250° F. over a period of about 30 minutes. At this time, if desired, the films 23 and 25 can be stripped from the cured resin panel. However, the films form a temporary protective skin or sheath for the resin and preferably are left in place during storage or shipment of the panel and may be stripped therefrom at the point of end use. Because of their thinness, the films are transparent and readily transmit the color of the resin when pigmented resin is used, as is usually the case. Thus the film-encased panels can be readily displayed and viewed in true color and yet have the surfaces thereof protected by the films from scratching or marring.

Figure 10:
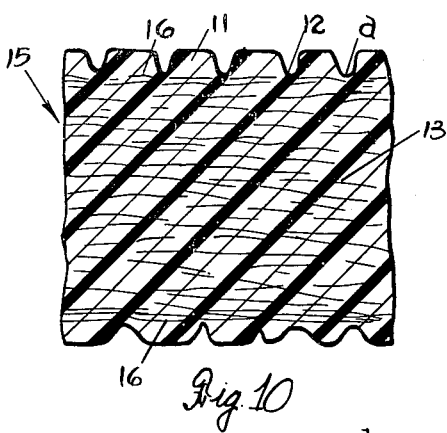
FIG. 10 is a fragmentary cross-sectional view similar to FIG. 9 illustrating a different disposition of the outermost reinforcing fibers.
Figure 14:
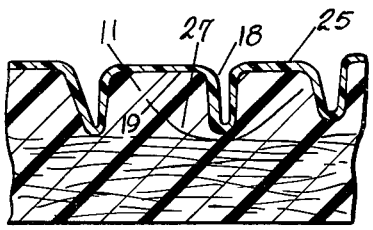
FIG. 14 is a fragmentary cross-sectional view illustrating the effects of lack of coordination of mound size and reinforcing fiber length in a resin panel.

To produce decorative panels having optimum erosion resistance it is important that the length of the reinforcing fibers be correlated to the pattern and size of the film protuberances. More specifially, and as shown in FIG. 10, it is desirable that each individual fiber be contacted by more than one protuberance 18 in the films 23 and 25. If this is not the case and, as shown in FIG. 14, a surface fiber 27 has a length equal to or less than the width of a valley 19 in the film 25, or a mound 11 in the resin, and is centered opposite a film protuberance 18, the fiber when contacted by the protuberance and forced toward the center of the resin will have the ends thereof deflected upwardly while moving due to the resistance of the resin and thus have its outermost extremities insufficiently covered by resin to afford best erosion resistance.

Therefore, it is desirable that each individual fiber be contacted by two or more protuberances in the film and thus the average width of the mounds, or spacing between film protuberances, should preferably be less than one-half the length of the preponderance of the reinforcing fibers. For best results, the width of the largest mound, in a pattern of varying mound sizes, should be less than one-half the length of the shortest fiber when fibers of varying length are used as reinforcement. Fiber lengths between about ½ to 4 inches in length have generally been found to be satisfactory. If very large mound sizes are used, for example ½ inch in width, the smallest fibers should preferably be longer than 1 inch.

Figure 15:
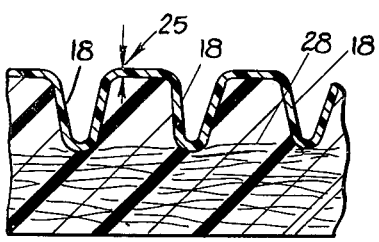
FIG. 15 is a fragmentary cross-sectional view illustrating the effects of a desirable coordination of mound size and fiber length in a resin panel.

Although the possibilty of some fiber lengths terminating just beyond the peak of a protuberance in the film exists, the effect, in terms of deflection of the fiber end, is greatly reduced when two or more film protuberances engage the fiber. Thus, for example, and as shown in FIG. 15, the fiber 28 has been depressed by three protuberances 18 bearing thereagainst and has its ends terminating slightly beyond the outermost protuberances. For ease of visualization, the deflection of the fiber has been exaggerated but it will be readily understood from theoretical continuous beam principles that the tendency of the fiber ends to deflect upwardly is resisted by the action of the resin against the fiber portions between the protuberances, and the reversal of the elastic curve at each of the fiber points of engagement with the protuberances acts against the tendency of the fiber ends to deflect upwardly.

Of course, many factors affect fiber deflection and, generally speaking, deflection of a given portion may be determined by the formula $$\Delta = K \frac{wl^3}{EI}$$

wherein w equals resistance of the resin in weight units, l equals the length of the fiber portion considered, E equals the modulus of elasticity, I equals the moment of inertia, and K equals a constant depending upon the points of fiber engagement by the protuberances. Satisfactory results in terms of non-excessive fiber deflection may be obtained by using fiber glass roving as reinforcement which comprises bundles of strands, each strand comprising a large number of filaments. For example, the roving may comprise 20 to 60 reinforcing strands each of which has 204 filaments having diameters of between 0.00023 to 0.00075 inch, resin viscosities between about 25 to 5000 centipoises at 77° F., resin mounds widths (or distances between film protuberances) between about $\frac{1}{16}$ inch to about ½ inch, and fiber modulus of elasticity between about 8 to $13 \times 10^6$.

Results in terms of fiber deflection, of course, can be varied within the above ranges. For example, if it is desired that fiber deflection be kept at a minimum, rovings having filament diameters of about 0.00075 inch, lengths about 4 inches, modulus of elasticity about $13 \times 10^6$, together with a resin viscosity of about 5000 centipoises, mound widths of about $\frac{1}{16}$ inch may be used. This correlation of fiber, resin, and pattern provides a fluid resin offering not too much resistance to movement of the fiber, relatively stiff fiber, and a multiplicity of fiber supports.

Preferred results have been obtained, however, when the resin viscosity at the time of fiber movement therein is held to between about 200 to 800 centipoises at 77° F., and the average mound diameter (or distance between film protuberances) is between about 9/32 to ¼ inch.

Regardless of the degree of fiber deflection, it is highly desirable that a relationship be established between the depth of resin covering the outermost reinforcing fibers in the mounds and the mound diameter or width.

Figure 16:
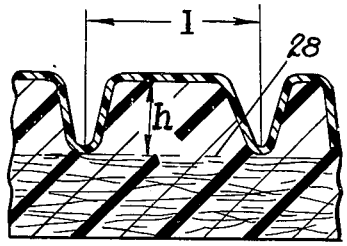
FIG. 16 is a fragmentary cross-sectional view of a portion of a resin panel for purposes of illustrating the depth to height relationship of the resin mounds forming the decorative surface of the panel.

To prevent cracking or crazing of the outermost surfaces of the resin mounds, the distance $h$ between such surfaces (FIG. 16) and the reinforcing fibers 26 therebeneath should not exceed about 0.07 inch. Preferably, the ratio between the mound width $l$ and the depth of resin cover $h$ for the outermost fibers lies between about 1 to 150, i.e., $$\frac{l}{h} = (1 \text{ to } 150)$$

It has been found that when the $l/h$ ratio is less than about 1, brittle mounds result which are easily damaged. On the other hand, when the $l/h$ ratio is over about 150, the mounds are either too wide so as to fail to provide a workable pattern or too shallow and thus the reinforcing fibers are covered with insufficient resin. It should be noted that the $l/h$ relationship is not, strictly speaking, dependent upon mound height, as measured from an adjacent valley, since $h$ is the distance between the reinforcing fibers and the surface of the mound. Therefore, if the fibers are deflected into the mounds as is the case in FIG. 10, the overall mound height as measured from an adjacent valley may be increased an amount equivalent to the fiber deflection, thus making possible mounds of greater depth which are adequately reinforced.

In FIGS. 17 and 18 is illustrated one form of apparatus which may be used to carry out the method of this invention in a continuous manner and which is somewhat similar to that disclosed in the co-pending application of Joseph S. Finger et al., Serial No. 393,804, now U.S. Patent No. 3,071,180. As shown in FIGS. 17 and 18, the apparatus includes a station G at which the resinous material is controllably flowed onto a patterned flexible film of cellulose acetate; a station H where the reinforcing fibers are randomly distributed onto the resin coated film; a station I at which a more thorough impregnation of the fibers is accomplished; a station J at which an additional patterned film is laid over the reinforced resinous assembly and thereafter where wrinkles and air may be removed from the envelope; station K identified as the partially curing operation; and station L where the partially cured structure is given the desired cross-sectional configuration and drawn through forming means wherein the curing thereof is substantially advanced.

The continuous forming apparatus includes an endless belt 30 disposed above rollers 29, which belt conveys the various elements of the laminate or makeup through the above stations G through J while said elements are being formed into a film-encased reinforced plastic envelope.

A roll 31 of patterned film 32 of this invention is preferably drawn forwardly, beneath and around the roller 33 and around and over the roller 34, thereafter passing under the laydown roller 35 where the film is placed upon the upper surface of the endless conveyor belt 30. The rollers 33 and 34 are vertically disposed relative to one another and function to maintain the film under the desired tension.

It is desirable to provide a channel or trough in the film 32 when adding liquid plastic and reinforcing material thereto in order to prevent spilling of the material. For this purpose a guide fence or rail 36 from the laydown roller 35 and preferably up to the station J. However, it may at times be desirable to terminate the guide fence 36 somewhat earlier as in the region of the station H.

Spaced from the laydown roller 35 is a hopper or other suitable means 37 containing liquid thermosetting resin 38, preferably of the polyester type, which flows downwardly from the mouth of said hopper into the flat trough or channel formed in the flexible film 32 by the guide rails 36.

In order to smooth out and control the flow of the resin in the channel on the lower film, a cylindrical metering roll 39 is positioned in contact with the resin and the height thereof above the lower film is controlled to give the desired thickness of resin.

Means are provided at station H to add reinforcing material to the liquid plastic and such means may include cutting apparatus of the type generally indicated at 40, which severs the glass roving 41 into relatively short lengths. The cutting apparatus may comprise a pair of rolls 42 and 43 between which the roving 41 is drawn from a plurality of tubes or packages 44 and severed by the knives 45 of the chopping roller 46. Although only one chopping device is shown in the drawings, it may at times be desired to arrange a multiplicity of choppers in longitudinal succession to obtain better coverage of the fibers by the resin.

After being chopped, the short lengths of fibers fall by gravity into the hood 47 and onto the liquid resin 48, thereby providing an excellent dispersion of lengths of glass fibers throughout the liquid resin. By chopping the reinforcing material into short lengths, as for example four inches or less, it has been found that less air or gas is entrapped than would be the case in the interstices of material such as a preformed mat.

Positioned in spaced relation to the hood 47 and generally constituting station I is a pair of impregnating rollers 49 and 50. These rollers are of the spiral type, and effectively operate to firmly press upstanding ends or edges of glass fibers into the liquid plastic 48. For this purpose, the rollers are provided with raised ribs and are located above the belt 30 so as to make a light pressing contact upon the impregnated resinous assembly. It is to be noted that the rollers are spiralled in opposite directions from one another. This arrangement has been found the most satisfactory because it operates to flow a resin bead forwardly and backwardly across the reinforcing fibers to submerge or urge the fibers downwardly into the layer of resin, downward movement of said fibers being limited by engagement with the peaks of the upwardly extending protuberances in film 32.

The back and forth movement of the resin bead also provides a continuous wetting of the rollers which substantially eliminates sticking of the fibers to the rollers and thus results in a more uniformly reinforced panel. Further, by having the rollers spiralled in opposite directions, the tendency of the fibrous reinforcement to be pushed off to one side by the first roller is counteracted by the second roller.

A second roll 51 of patterned film 52 is provided, said film passing through the rollers 53 and 54, and being smoothly placed upon the upper surface of the reinforced, liquid resin by means of the lowermost roller 54.

Prior to actually laying the second film onto the glass embedded polyester resin mass, it may at times be desirable to spray or otherwise apply a suitable accelerator on the resin to promote the gelation thereof. Accelerators which are effective for this purpose are cobalt naphthenate, cobalt lineoresinate and lauryl mercaptan.

To remove excess air from the fibrous reinforced resin positioned between the flexible films 32 and 52 and to seal their marginal edges, there is provided a pressing device 55, which may be carried by suitable framework, and comprising a transversely extending mounting member 56 to which is secured under tension a bowed metal strip 57. The strip 57 is positioned relative to the upper flexible film so as to exert a pressing force thereon, thereby functioning to lay down the upper film and to sweep rearwardly and sidewardly of the enclosed assembly substantially all of the excess air and resin residing therebetween.

Prior to forming the film-encased reinforced resin into the desired shape, and in order to give it sufficient strength to be pulled and to facilitate its handling, it is desirable at station K to initiate the polymerization of the resin 48, that is, to fix the physical relation of resin to glass.

Thus, at station K there is provided an oven 58 having suitable heating means 59 therein and provided with upper and lower moving continuous belts 60 and 61 between which the film-encased resin is conveyed through the oven. The upper flight of the lower belt 61 is supported substantially horizontally, while the lower flight of the upper belt sags into contact with the encased resin and affords the desired pressure to insure full penetration of the protuberances of the films into the resin.

When passing through the oven 58, the film-encased resin may, if so desired, be cured to its rigid state when flat panels are being produced. However, when it is desired to form corrugated panels, the resin is only partially cured or polymerized to a gel stage. At this stage, the resin will not flow and is formed to the pattern of the films, and the position of the reinforcing fibers with respect to the resin is fixed.

In gelling the resin, however, some care must be taken since it has been found that polyester resins attack cellulose acetate films and cause a puckering or wrinkling of the film. Therefore, it is desirable that the gel temperature be maintained below about 175° F. and that the gel be effected in less than about 10 minutes. In continuous systems such as that shown in FIGS. 17 and 18, excessive tension on the films and high gel temperature can cause a stretching of the film pattern so that it is desirable to keep film tension at the minimum required to overcome friction in the apparatus and to gel the resin at less than about 165° F.

After leaving the oven 58, the partially cured assembly is pulled forwardly by belts 62 over a female mold section 63 whereon it is pressed by a plurality or roller elements 64 and guided thereby through heated matching mold elements 65 and 66, said latter element 66 normally being an extension of the section 63. The belts 62 may be formed of a resilient material and are trained about pulleys 67 carried by shafts 68. Belts are provided both above and below the cured panel, and by frictional engagement therewith, draw the partially cured assembly through station L after which corrugated panel may be cut into suitable lengths.

The roller elements 64 may be formed of wood or metal and carry thereon one or more rollers 69, which may also be of wood composition. The rollers 69 may be formed as an integral part of the elements 64 and are arranged to contact the upper surface of the partially cured assembly and to press the assembly downwardly by rolling contact into the groove or other cross-sectional arrangement provided by the mold section 63. In order to effect this result, it is, of course, desirable that the vertical axis of each of the rollers be in substantially exact alignment with the complementary groove in the mold 63 located therebeneath. The rollers are arranged to press the partially cured structure first in the central portion, and then in successive steps outwardly of the center to the marginal side edges thereof. Accordingly, the roller elements 64 are provided with an increasing number of rollers 69, such as one, three, five, seven, nine, eleven, and thirteen, depending, of course, upon the desired width of the final product.

The mold elements 65 and 66 are preferably formed of metal and present a corrugated cross-section when such a configuration is desired in the finished structural panel herein produced. The elements 65 and 66 are spaced from one another a distance sufficient to permit the partially cured assembly to be drawn readily therethrough, and at the same time to provide a limited frictional engagement therewith.

Positioned beneath the mold elements is an open-top heating chamber 70 carrying in its interior a plurality of heating lamps 71. These lamps may be of the infrared type, and are effective to substantially completely polymerize the plastic resin and convert it into a hard, strong and solid mass.

After the final curing has been substantially completed, the reinforced plastic panel may be cut into suitable lengths for shipping.

Thin films of plastic, such as cellulose acetate, when used in the continuous process herein disclosed, offer several advantages not found when, for example, thin sheets of metal are employed. First and foremost, the cost of cellulose acetate film is almost negligible when compared to metal. Also, the acetate film can easily be contoured to the required design by passing the same between a pair of heated rolls having the design embossed thereon. The flexibility of the acetate film also enables the subsequent shaping of the resin to form, for example, corrugated panels. In addition, the films may be left in place during storage, shipment, etc., of the panels to protect the same.

Thus, the patterned plastic films provide a means of imparting a decorative surface configuration to the resin, a means of forcing the surface fibers deeper into the resin, a carrier during the processing of the resin, and a protective coating therefor.

Figure 19:
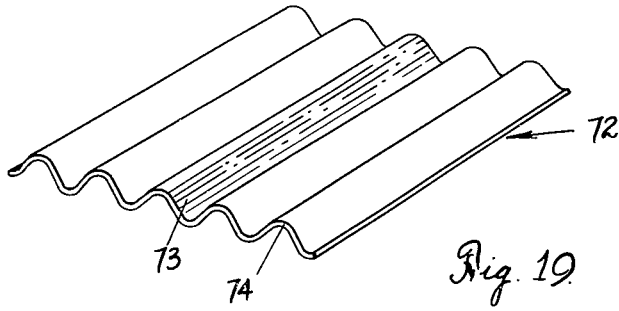
FIG. 19 is a perspective view of a fibrous reinforced resin panel of corrugated cross-section and having a fluted surface pattern.
Figure 20:
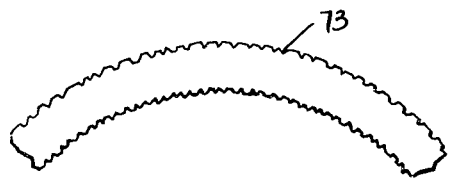
FIG. 20 is an enlarged fragmentary end view of the panel shown in FIG. 19.

Reinforced resin panels having various surface configurations and increased resistance to erosion may be produced in accordance with the method of the invention. To produce fluted panels 72 of the type shown in FIGS. 19 and 20 by the apparatus shown in FIGS. 17 and 18, the films are formed with spaced protuberances therein which are continuous and run parallel to the side edges of the films. The height and width of the protuberances, as well as the valley width therebetween, may be maintained within the limits previously set forth for the film used to manufacture panels of the type shown in FIGS. 1 and 2. The principal advantages to having the protuberances or ridges 73 in the panel 72 running parallel to the corrugations 74 is that when such a panel is disposed at an angle to the horizontal, rain water flowing therealong will be unimpeded throughout the length of the panel and thus be more effective as a cleansing agent. At the same time, however, the fibrous reinforcement beneath the protuberances is adequately protected by resin.

In the foregoing description of the invention, the improved resin panel, as well as the method of producing the same, was described in connection with panels having both surfaces thereof patterned. It will be readily understood, however, that a smooth film may be used adjacent one side of the panel, when only one surface thereof is to be patterned. Also, although the preferred form of the method of the invention involves first forming a layer of resin and then incorporating the fibrous reinforcement therein, it may at times be desirable to vary this procedure somewhat. For example, the fibrous reinforcement may be mixed with the fluid resin in the hopper 37 (FIG. 17) and then deposited on the patterned film 32. In this case, the resin flows downwardly between and around the protuberances in the film while the downward movement of the fibers is limited by engagement with the peaks of the upwardly extending protuberances. Thus, the position of the lowermost fibers is fixed as is shown in FIG. 12.

Although the resin mounds comprising the decorative surface pattern have been illustrated in FIGS. 1 and 2 and described as irregular in shape, a pattern of circular, hexagonal, diamond, etc., mounds could be used depending upon the desired appearance of the panel.

It is to be understood that the forms of the invention herewith described are to be taken as illustrative embodiments only of the same, and that various changes may be resorted to without departing from the spirit of the invention or the scope of the subjoined claims.

What I claim is:

1. A method of forming an erosion resistant resin panel, comprising moving a fluid resin containing reinforcing fibers into contact with a supporting surface having upwardly directed preformed spaced protuberances therein whereby the resin flows downwardly between said protuberances but downward movement of the fibers between the protuberances is prevented by contact with said protuberances, said resin layer containing reinforcing fibers being thicker than the height of fiber-free resin between the protuberances, and then curing the resin while in contact with said surface.

2. A method of forming an erosion resistant thermosetting resin panel, comprising sandwiching a bed of fluid thermosetting resin containing reinforcing fibers between a pair of films, at least one of which has a multiplicity of preformed protuberances formed therein and directed toward the resin, applying pressure to the laminate thus formed to force the protuberances of the film into the resin and into contact with the reinforcing fibers whereby said fibers are moved away from the surface of the resin contacting the film by the protuberances thereof, and then curing the resin in contact with the films to a final state.

3. A method of forming an erosion resistant resin panel, comprising flowing fluid thermosetting resin onto a support having a multiplicity of protuberances extending upwardly therefrom and into the resin a limited distance, moving reinforcing fibers into the resin from the upper surface thereof downwardly toward the protuberances, downward movement of the fibers beyond the peaks of said protuberances being limited by said peaks engaging said fibers, and then curing the resin to a hard mass.

4. A method of forming an erosion resistant resin panel as defined in claim 3, wherein prior to curing, an upper film having a multiplicity of protuberances extending downwardly from the lower surface thereof is applied to the upper surface of the fiber containing resin, and pressure is applied to said upper film to force the protuberances therein downwardly into contact with the fibers in the resin to move said fibers away from the upper surface of the resin.

5. A method of forming an erosion resistant resin panel as defined in claim 3, wherein the fibers are distributed over the surface of the layer of resin, and then moved downwardly by flowing resin from said layer over the fibers.

6. A method of forming an erosion resistant resin panel, comprising flowing a layer of fluid thermosetting resin onto a moving continuous film having a multiplicity of upwardly directed protuberances formed thereon, distributing reinforcing fibers over the surface of the moving layer of resin, submerging said fibers in the resin, depositing on the surface of the resin a second moving continuous film having a multiplicity of protuberances extending downwardly therefrom, each of said protuberances being of a width less than one half the average length of the reinforcing fibers, applying pressure to the second film to force the protuberances thereof downwardly into engagement with the fibers in the resin to move said fibers away from the surface of the resin, and continuing to move the film-encased layer of resin while curing the same to a hard mass.

7. A method of forming an erosion resistant resin panel, comprising flowing a layer of fluid thermosetting resin onto a film, incorporating reinforcing fibers in the layer of resin, applying a second film to the upper surface of the fibrous reinforced resin, at least one of said films having a multiplicity of protuberances in pattern-like form directed toward the resin and sufficient amount so as to provide at least 4 to 8 mounds per sq. in. of resin surface, applying pressure to the film resin laminate to force the film protuberances inwardly into the resin to engage the reinforcing fibers and move said fibers toward the interior of the resin panel, curing the resin to a gel stage to gel the surface of the resin to the pattern of the film protuberances and fix the relationship of the resin to the reinforcing fibers, contouring the gelled resin laminate, and then completing the cure of the contoured laminate to its hard state.

8. A method of forming an erosion resistant thermosetting resin panel, comprising forming a bed of fluid resin containing grouped reinforcing fibers having diameters of between about 0.00023 to about 0.00075 inch, moving the reinforcing fibers from a first position within and adjacent a surface of said bed of resin to a second position inwardly from said surface, while maintaining the viscosity of the resin between about 200 to 800 centipoises, by applying a film having a multiplicity of preformed protuberances therein onto a surface of the bed of resin and applying pressure to said film to force the protuberances inwardly into the resin and into contact with the fibers to move the outermost fibers adjacent a surface of the bed of resin from the first to the second position, and then curing the resin to a hard mass while maintaining said fibers in the second position.

9. A method of forming an erosion resistant resin panel as recited in claim 3, wherein the reinforcing fibers are glass fibers.

10. A method of forming an erosion resistant thermosetting resin panel as recited in claim 8, wherein the reinforcing fibers are glass fibers.

References Cited by the Examiner

UNITED STATES PATENTS

| | | | |
|---|---|---|---|
| 2,489,242 | 11/1949 | Slayter et al. | 156—29 |
| 2,565,491 | 8/1951 | Francis | 156—230 |
| 2,784,763 | 3/1957 | Shorts | 156—29 |
| 2,809,145 | 10/1957 | McDermott | 161—123 |

EARL M. BERGERT, *Primary Examiner.*

R. J. ROCHE, *Assistant Examiner.*